US012106436B2

(12) United States Patent
Ju

(10) Patent No.: US 12,106,436 B2
(45) Date of Patent: Oct. 1, 2024

(54) TRANSFORMING THREE-DIMENSIONAL MODEL BY USING CORRELATION TO TEMPLATE MODEL WITH TEMPLATE SKELETON

(71) Applicant: CLO Virtual Fashion Inc., Seoul (KR)

(72) Inventor: Eun Jung Ju, Seoul (KR)

(73) Assignee: CLO Virtual Fashion Inc., Seoul (KR)

( * ) Notice: Subject to any disclaimer, the term of this patent is extended or adjusted under 35 U.S.C. 154(b) by 120 days.

(21) Appl. No.: 17/819,242

(22) Filed: Aug. 11, 2022

(65) Prior Publication Data

US 2023/0196678 A1 Jun. 22, 2023

(30) Foreign Application Priority Data

Dec. 17, 2021 (KR) ........................ 10-2021-0182019

(51) Int. Cl.
*G06T 17/20* (2006.01)
*G06T 19/20* (2011.01)
(52) U.S. Cl.
CPC ............ *G06T 17/205* (2013.01); *G06T 19/20* (2013.01); *G06T 2200/04* (2013.01); *G06T 2219/2004* (2013.01)
(58) Field of Classification Search
CPC ... G06T 17/205; G06T 19/20; G06T 2200/04; G06T 2219/2004
See application file for complete search history.

(56) References Cited

U.S. PATENT DOCUMENTS 10,628,666 B2 * 4/2020 Sareen .................... G06T 19/00
2015/0178988 A1 * 6/2015 Montserrat Mora ... G06T 17/20
345/420

OTHER PUBLICATIONS

Feng, Andrew, Dan Casas, and Ari Shapiro. "Avatar reshaping and automatic rigging using a deformable model." Proceedings of the 8th ACM SIGGRAPH Conference on Motion in Games. 2015. (Year: 2015).*
Anguelov, Dragomir, et al. "Scape: shape completion and animation of people." ACM SIGGRAPH 2005 Papers. 2005. 408-416. (Year: 2005).*

* cited by examiner

*Primary Examiner* — Xin Sheng
(74) *Attorney, Agent, or Firm* — WTA Patents

(57) ABSTRACT

A method and apparatus for transforming an input model according to an example embodiment are disclosed. The method includes receiving an input model including a first mesh with a first topology, generating a template model including a second mesh with a second topology, aligning the template model with the input model, generating correlation information between the second mesh of the aligned template model and the first mesh of the input model, generating, based on a skeleton of the aligned template model, a skeleton of the input model, generating, based on the correlation information, first skinning information indicating a connection relation between the skeleton of the input model and the first mesh, and transforming, based on at least one of the correlation information and the first skinning information, the input model.

21 Claims, 12 Drawing Sheets

|  |  | Outer shape of template model | | Outer shape of input model | |
|---|---|---|---|---|---|
|  |  | Resizable | Body shape of input model | Resizable | Body shape of input model |
| Topology-based feature | Avatar editor (resizing) | X | Template models | O | X |
|  | Hair/shoes accessory | O |  | X | X |
|  | Auto draping | O |  | O | O |
|  | Auto grading | O |  | O | O |
|  | Size measurement | O |  | O | O |
|  | Symmetry body shape | O |  | O | O |
| Rig-based feature | Pose & motion | O |  | O | O |
|  |  | Type A | | Type B | Type C |

FIG.10

TRANSFORMING THREE-DIMENSIONAL MODEL BY USING CORRELATION TO TEMPLATE MODEL WITH TEMPLATE SKELETON

CROSS-REFERENCE TO RELATED APPLICATION

This application claims the benefit of Korean Patent Application No. 10-2021-0182019 filed on Dec. 17, 2021, in the Korean Intellectual Property Office, the entire disclosure of which is incorporated herein by reference for all purposes.

BACKGROUND

1. Field of the Invention

Embodiments relate to transforming a three-dimensional (3D) model by determining and using a template model that is correlated with the 3D model.

2. Description of the Related Art

An avatar used for pattern generation and auto draping of a garment may have various topologies and/or textures. A manufacturer or a user may use various types of avatars with different topologies suitable for his or her task. However, when modifying or transforming an appearance, body shape, accessory, and the like of an avatar, the different topology of the avatar may complicate the modification or transformation. That is, avatars with different topology may involve different rigs or control schemes. Such transformation may be made on human shaped avatars as well as non-human shaped a three-dimensional (3D) virtual characters.

SUMMARY

Embodiments relate to transforming an input model. An input model including a first mesh with a first topology is received. A template model including a second mesh with a second topology is received. The template model including a template skeleton. The template model is aligned with the input model to generate an aligned version of the second mesh and an aligned version of the template skeleton. Correlation between the aligned version of the second mesh and the first mesh is determined. A model skeleton of the input model is determined based on the aligned version of the template skeleton. First skinning information indicating relationships between the model skeleton and the first mesh according to the correlation is determined. A transformed version of the input model is generated using the correlation and the first skinning information.

BRIEF DESCRIPTION OF THE DRAWINGS

These and/or other aspects, features, and advantages of the invention will become apparent and more readily appreciated from the following description of example embodiments, taken in conjunction with the accompanying drawings of which:

FIGS. 9 and 10 are diagrams illustrating types of avatars obtainable from a template model by a method for transforming an input model, according to an example embodiment.

DETAILED DESCRIPTION

Figure 1:
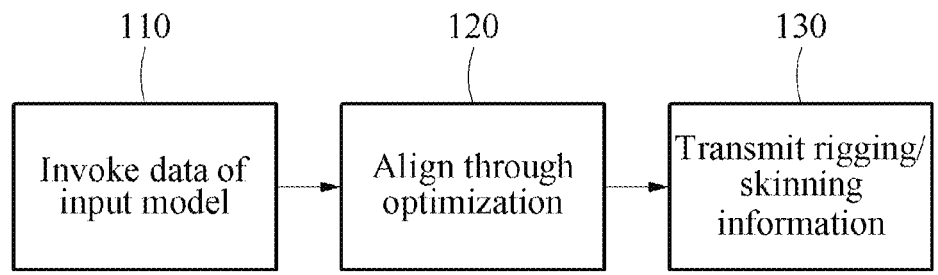
FIG. 1 is a diagram conceptually illustrating a method for transforming an input model, according to an example embodiment.

Hereinafter, example embodiments are described in detail with reference to the accompanying drawings. Various modifications may be made to the example embodiments. The example embodiments are not construed as being limited to the disclosure and should be understood to include all changes, equivalents, and replacements within the idea and the technical scope of the disclosure.

The terminology used herein is for the purpose of describing particular example embodiments only and is not to be limiting of the example embodiments. As used herein, the singular forms "a," "an," and "the" are intended to include the plural forms as well, unless the context clearly indicates otherwise. As used herein, the term "and/or" includes any one and any combination of any two or more of the associated listed items. It will be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined herein, all terms used herein including technical or scientific terms have the same meanings as those generally understood by one of ordinary skill in the art. Terms defined in dictionaries generally used should be construed to have meanings matching contextual meanings in the related art and are not to be construed as an ideal or excessively formal meaning unless otherwise defined herein.

In addition, when describing the example embodiments with reference to the accompanying drawings, like reference numerals refer to like components and a repeated description related thereto will be omitted. When describing the example embodiments, detailed description of well-known related structures or functions will be omitted when it is deemed that such description will cause ambiguous interpretation of the example embodiments.

In addition, it will be understood that, although the terms first, second, A, B, (a), (b), and the like may be used herein to describe various components of the example embodiments, these terms are only used to distinguish one component from another component and essential, order, or sequence of corresponding components are not limited by these terms. It will be understood that when one component is referred to as being "connected to," "coupled to," or "linked to" another component, one component may be "connected to," "coupled to," or "linked to" another component via a further component although one component may be directly connected to or directly linked to another component.

The same name may be used to describe a component included in an example embodiment and a component having a common function in another example embodiment. Unless otherwise mentioned, the description on the example embodiment may be applicable to the other example embodiment and thus, duplicated description will be omitted for conciseness.

FIG. 1 is a diagram conceptually illustrating a method for transforming an input model, according to an example embodiment. FIG. 1 illustrates a process of transforming an input model by an apparatus for transforming an input model (hereinafter, "transformation apparatus"), according to an example embodiment.

For example, an input model including a first mesh with a topology A is received, and transformation of the input model may be desired according to a template model including a second mesh with a topology B. A "topology" refers to relationships between polygons including sizes, positions, and the number of polygons included in meshes of each model. The topology A and the topology B may be different from each other.

In operation 110, the transformation apparatus may invoke data of the input model. The data of the input model may be represented, for example, as positions of feature points corresponding to each body part of the input model, or may be represented in the form of a feature vector. The data of the input model may include information indicating an appearance, body shape, hairstyle, accessory, and the like of the input model. In addition, the transformation apparatus may invoke or generate a template model including a mesh with the topology B to correspond to the input model. The template model may be pre-stored in a database including a plurality of template models having various genders, appearances, body shapes, and the like. The transformation apparatus may extract a feature of the template model.

In an example embodiment, the input model and the template model may include a mesh including a plurality of polygons. Depending on example embodiments, the mesh may be modeled in various manners. For example, vertices of a polygon included in the mesh may be point masses, and sides of the polygon may be represented as springs with elasticity that connect the masses. Alternatively, the mesh may be modeled as a strain model. The polygon included in the mesh may be modeled, for example, as a triangle or a polygon with sides greater than or equal to sides of quadrangle. In some cases, when presence of three-dimensional (3D) volume is involved, the mesh may be modeled as a 3D polyhedron.

The vertices of the polygon(s) included in the mesh may be moved by, for example, an external force such as gravity and an internal force such as stretching, shearing, bending, and the like. When a force applied to each vertex is obtained by calculating the external and internal forces, a displacement speed and motion of each vertex may be obtained. The vertices of the polygon(s) included in the mesh may move according to action of an external force such as gravity and an internal force such as stretching, shearing, and bending. When a force applied to each vertex is calculated by calculating the external and internal forces, a displacement speed and movement speed of each vertex may be obtained. In addition, a movement of the 3D model may be simulated through movements of the vertices of the polygon of the mesh at each time step.

In operation 120, the transformation apparatus may align the template model with the input model through an optimization process according to the data of the input model invoked in operation 110 and features extracted from the template model. The transformation apparatus may generate correlation information between the second mesh of the template model aligned with the input model and the first mesh of the input model. An example of the correlation information may be barycentric coordinates, but is other correlation information may also be used. The barycentric coordinates, which represent a space in a form of combining masses of referenced points, may also be referred to as a "center of mass coordinates."

The transformation apparatus may automatically transform the input model using, for example, barycentric coordinates between the input model and the template model, without an input from a user.

The transformation apparatus may perform resizing between models, auto draping of transforming and draping a garment according to a body shape of a model, and auto grading of automatically converting a garment size. As will be described below, the barycentric coordinates may be also used to convert the template model according to a measurement line inputted by the user.

In operation 130, the transformation apparatus may transmit, based on the correlation information between the second mesh of the template model aligned with the input model and the first mesh of the input model, rigging information and/or skinning information to transform the input model.

"Rigging" refers to the process of attaching a skeleton to modeled data or a modeled avatar. Directly selecting and operating polygons or vertices of a mesh representing a modeled avatar may consume an extensive amount of time. An overall movement of a model may be represented more quickly and naturally by moving a skeleton of the avatar through rigging and transforming of the pose of the model. The rigging information may be associated with to a skeleton of the template model and may be pre-stored for each template model.

"Skinning" refers to the process of assigning meshes with weights on bones of a skeleton to reflect the movement of the bones to the meshes. The skinning information may indicate relationships between bones of a skeleton of a corresponding model (for example, a template model) and meshes of the corresponding model. For example, the skiing information indicates how much weight is given transformation of bones in a skeleton to deform each of vertices of the mesh included in the corresponding model attached to the skeleton.

By transmitting the rigging information and/or skinning information of the template model(s) to the input model, the transformation apparatus may apply a pose or motion of the template model(s) to the input model, or apply a pose or motion of the input model to the template model.

Figure 2:
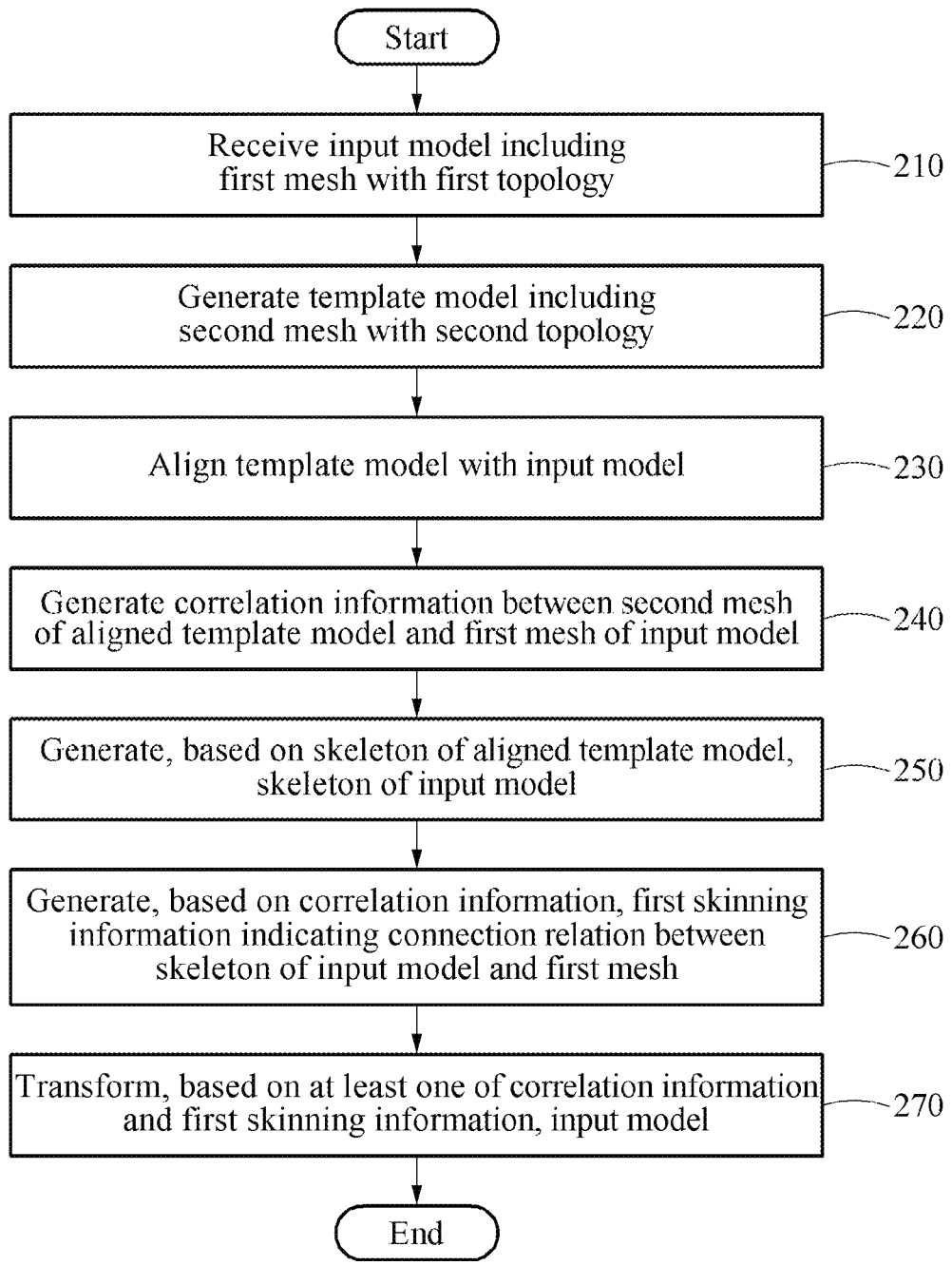
FIG. 2 is a flowchart illustrating a method for transforming an input model, according to an example embodiment.

FIG. 2 is a flowchart illustrating a method for transforming an input model, according to an example embodiment. Hereinafter, respective operations are illustrated as being performed sequentially, but this is merely for illustrative purposes. For example, an order of the respective operations may be changed, and at least two operations may be performed in parallel.

FIG. 2 illustrates a process of transforming, by a transformation apparatus, an input model through operations 210 to 270 according to an example embodiment. In operation 210, the transformation apparatus may receive an input model including a first mesh with a first topology. The input model may include, for example, at least one of a 3D avatar, a 3D virtual object, and a 3D character, but is not limited thereto. The first mesh may include, for example, a vertex arrangement, an index arrangement, and the like.

In operation 220, the transformation apparatus may generate a template model including a second mesh with a second topology. In this case, the second mesh may include, for example, a template skeleton, a vertex arrangement, an index arrangement, and the like.

Hereinafter, the "first mesh," which corresponds to the input model refers to a mesh according to the first topology. A polygon included in the first mesh will be referred to as a "first polygon," and vertices of the first polygon will be referred to as a "first vertex." In addition, the "second mesh," which corresponds to the template model, may refer to a mesh according to the second topology. A polygon included in the second mesh will be referred to as a "second polygon," and vertices of the second polygon will be referred to as second vertices.

In operation 230, the transformation apparatus may align the template model generated in operation 220 with the input model received in operation 210. The transformation apparatus may adjust a size and a position of the second polygon included in the second mesh such that an outer shape of the template model corresponds to an outer shape of the input model. A method for aligning, by the transformation apparatus, the input model is described below in more detail with reference to FIGS. 3 and 4.

In operation 240, the transformation apparatus may generate correlation information between the second mesh of the template model aligned through operation 230 and the first mesh of the input model received in operation 210. The transformation apparatus may generate the correlation information between the first mesh and the second mesh. The correlation information may be, for example, barycentric coordinates, but is not necessarily limited thereto.

The transformation apparatus may identify a first polygon of the input model corresponding to a second polygon of the template model using relationships between indices of the second polygon of the template model aligned through operation 230 and indices of the first polygon of the input model. The transformation apparatus may determine positions of the vertices of the first polygon or the second polygon through the correspondence relation between the indices of the polygons. The transformation apparatus may generate correlation information between the first mesh and the second mesh, using an index of the first mesh corresponding to an index of the second polygon of the second mesh of the template model. In addition to an index of a polygon corresponding to each vertex of a mesh, the transformation apparatus may store α and β, which are coefficients for calculating barycentric coordinates, and an offset between barycentric coordinates of the first polygon and the vertices of the second polygon (or an offset between barycentric coordinates of the second polygon and the vertices of the first polygon).

The transformation apparatus may generate, for example, at least one of barycentric coordinates between second vertices of the second polygon included in the second mesh and the first polygon included in the first mesh, and barycentric coordinates between first vertices of the first polygon included in the first mesh and the second polygon included in the second mesh.

A method for generating, by the transformation apparatus, the correlation information, and an example of using the correlation information are described below in more detail with reference to FIGS. 5 and 6.

In operation 250, the transformation apparatus may generate, based on a template skeleton of the template model aligned in operation 230, a model skeleton of the input model. The transformation apparatus may generate, based on rigging information corresponding to the an aligned version of the template skeleton of the aligned template model, the skeleton of the input model. A process of generating, by the transformation apparatus, the skeleton of the input model is described below in more detail with reference to FIG. 7.

In operation 260, the transformation apparatus may generate, based on the correlation information generated through operation 240, first skinning information indicating relationships between the first mesh and the model skeleton of the input model generated in operation 250. The transformation apparatus may generate the first skinning information by combining the correlation information generated in operation 240 and second skinning information. The second skinning information may correspond to information indicating a connection relation between the aligned version of the template skeleton of the aligned template model and the second mesh. The second skinning information may indicate a degree to which each of the second vertices included in the second mesh is connected to at least one of a plurality of bones included in the skeleton of the input model. The first skinning information may indicate a degree to which each of the first vertices included in the first mesh is connected to at least one of the plurality of bones included in the skeleton of the input model.

In operation 270, the transformation apparatus may transform the input model, based on at least one of the correlation information generated through operation 240 and the first skinning information generated through operation 260. The transformation apparatus may receive an instruction for controlling the aligned template model. The transformation apparatus may transform the input model by applying, based on at least one of the correlation information and the first skinning information, the instruction for controlling the aligned template model to the input model. In this case, the instruction for controlling the aligned template model may include, for example, a transformation type described below with reference to FIG. 9.

The transformation apparatus may render, based on the first topology-based texture information, the input model transformed through operation 270. A mesh of the input model transformed through operation 270 may include, for example, information on a model skeleton, a vertex arrangement, an index arrangement, a weight arrangement, and the like.

Transformation types that are transformable from the template model by the method for transforming an input model according to an example embodiment are described below in more detail with reference to FIGS. 9 and 10.

Figure 3:
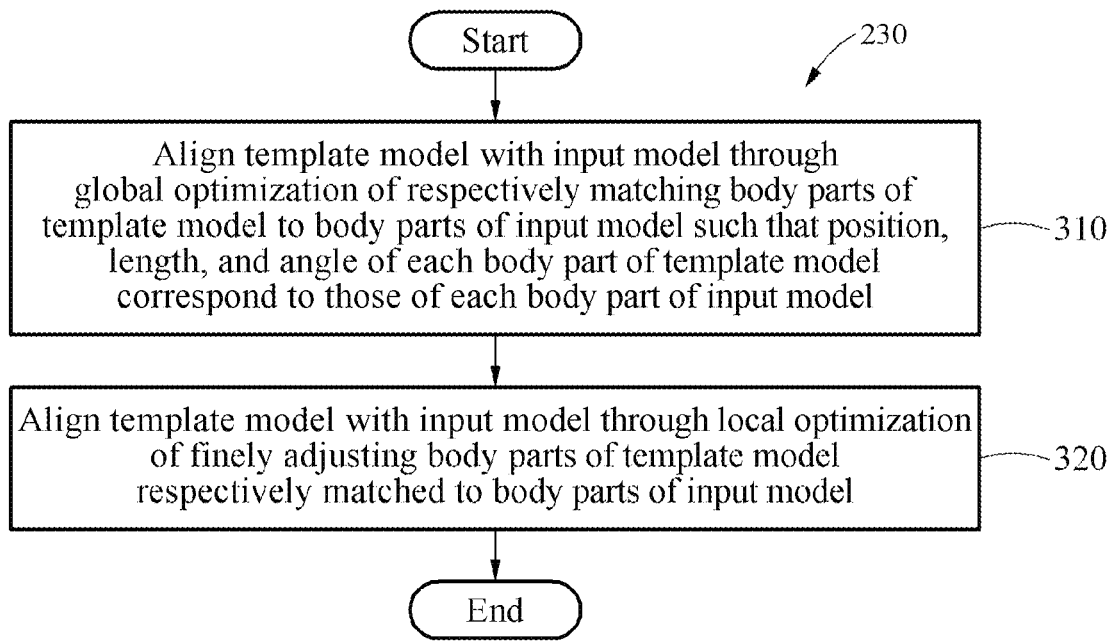
FIG. 3 is a flowchart illustrating a method for aligning a template model with an input model, according to an example embodiment.

FIG. 3 is a flowchart illustrating a method for aligning a template model with an input model according to an example embodiment, and FIG. 4 is a diagram illustrating a method for aligning a template model with an input model according to an example embodiment. Hereinafter, respective operations are illustrated as being performed sequentially for the purpose of illustration, but variations may be made to FIG. 3. For example, an order of the respective operations may be changed, and at least two operations may be performed in parallel. FIGS. 3 and 4 illustrate a process of aligning, by a transformation apparatus, a template model with an input model through operations 310 and 320.

Figure 4A:
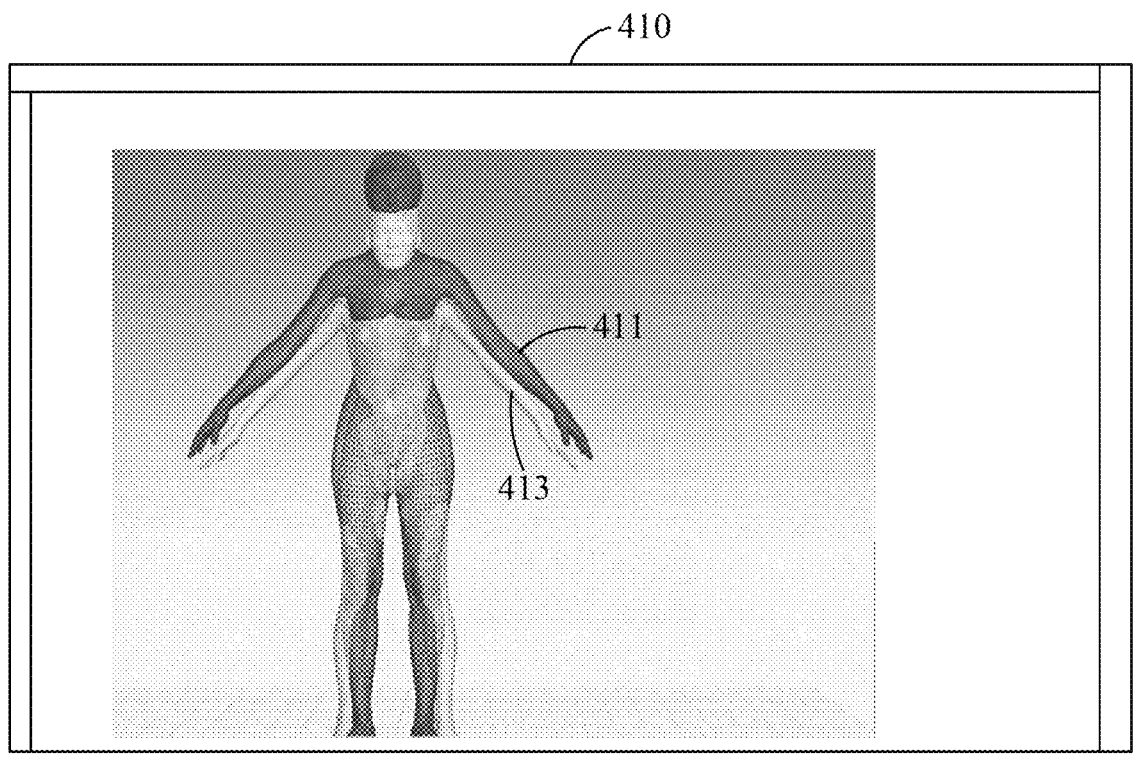
FIGS. 4A and 4B are diagrams illustrating a method for aligning a template model with an input model, according to an example embodiment.
Figure 4A:
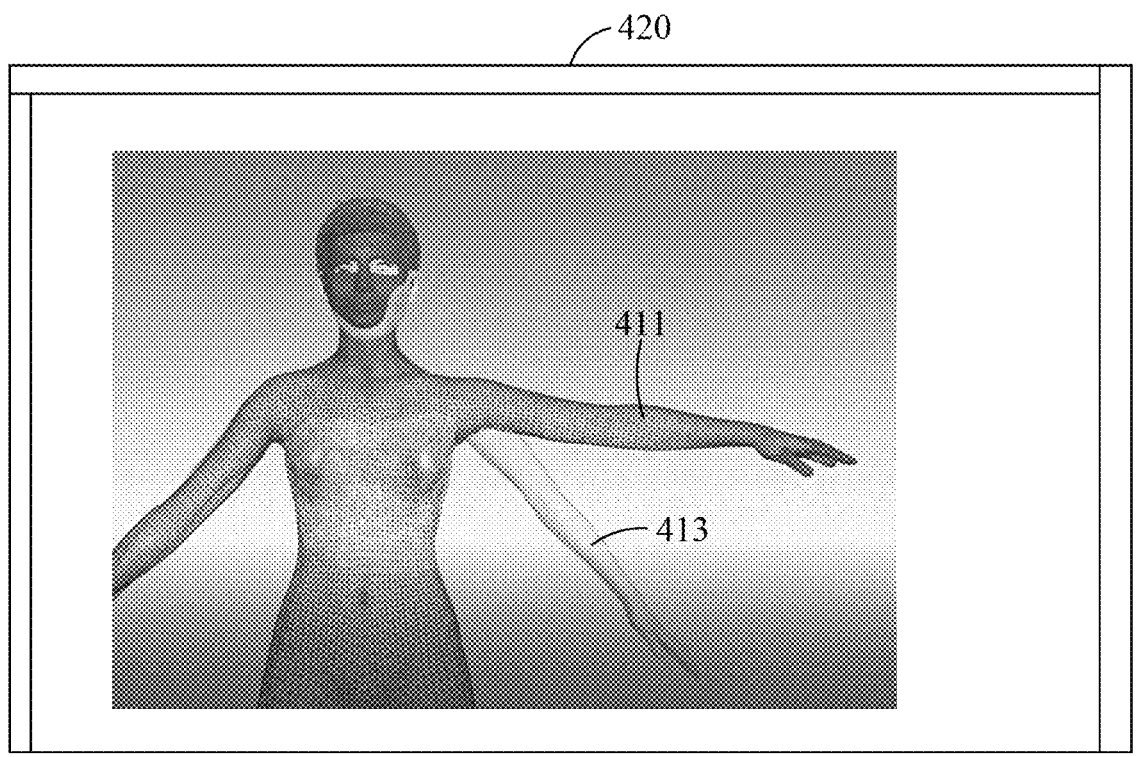

In operation 310, the transformation apparatus may align a template model 411 with an input model 413 through global optimization of respectively matching body parts of the template model 411 illustrated in drawing 410 of FIG. 4A to body parts of the input model 413 such that a position, length, and angle of each body part of the template model 411 correspond to those of each body part of the input model 413. For example, the transformation apparatus may perform matching such that a position, length, angle, and pose of each body part of the template model 411 correspond to those of each body part of the input model 413. The transformation apparatus may adjust a size and a position of a second polygon included in a second mesh of the template model 411 such that an outer shape of the template model 411 matches closely to an outer shape of the input model 413. For example, the transformation apparatus may perform optimization in a vertical direction (key direction) through a process of increasing or decreasing a height of the template model 411, as illustrated in drawing 410. After the template model 411 and the input model 413 have the same height through optimization in a vertical direction, the transformation apparatus may perform optimization in a horizontal direction through a process of widening or narrowing a waist of the template model 411.

As illustrated in drawing 420 of FIG. 4A, the transformation apparatus may perform matching such that a pose of each body part of the template model 411 matches closer to that of each body part of the input model 413 through an operation of moving arms, legs, neck, and the like of the template model 411 upward and downward, or an operation of folding or unfolding the arms, legs, neck, and the like.

In operation 320, the transformation apparatus may align the template model 411 with the input model 413 through local optimization of finely adjusting the body parts of the template model respectively matched to the body parts of the input model. For example, as illustrated in drawing 430 of FIG. 4B, the transformation apparatus may finely adjust an arm part 415 of a template model matched to an arm part 417 of an input model such that the outer shape of the template model 411 match closer to the outer shape of the input model 413. The transformation apparatus may align the template model 411 with the input model 413 by finely adjusting each of the second polygons of the second mesh corresponding to each of the body parts of the template model 411.

Figure 4B:
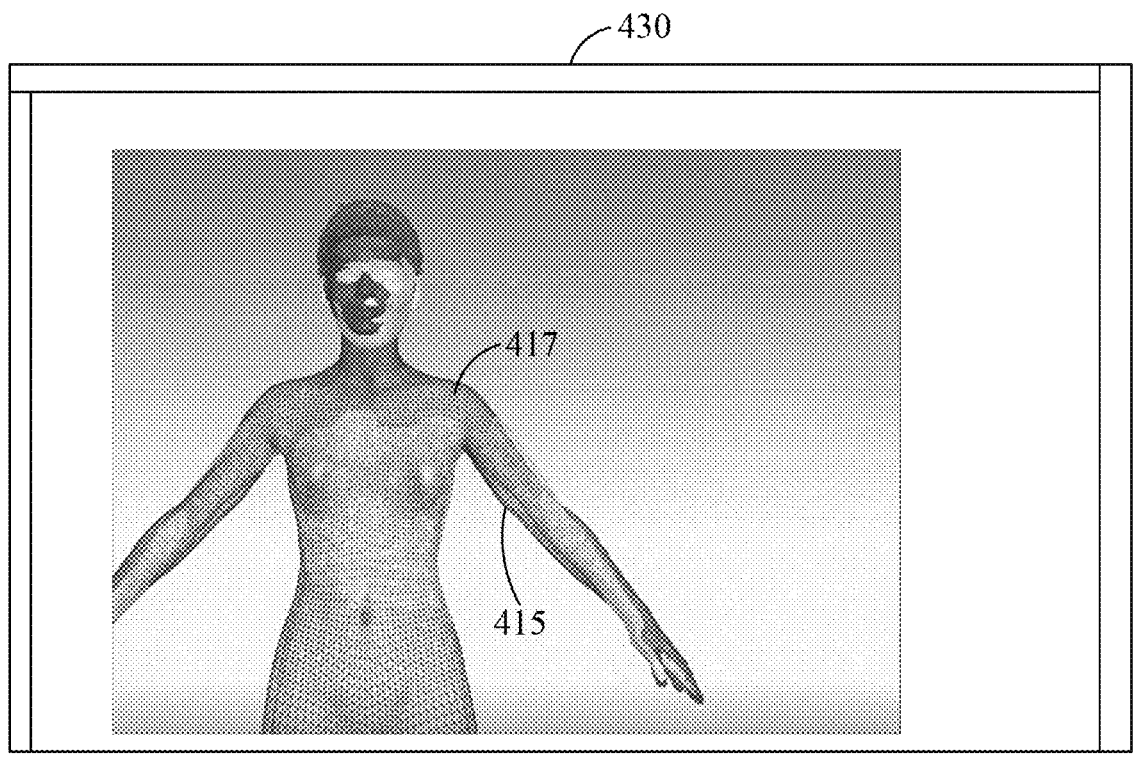
Figure 4B:
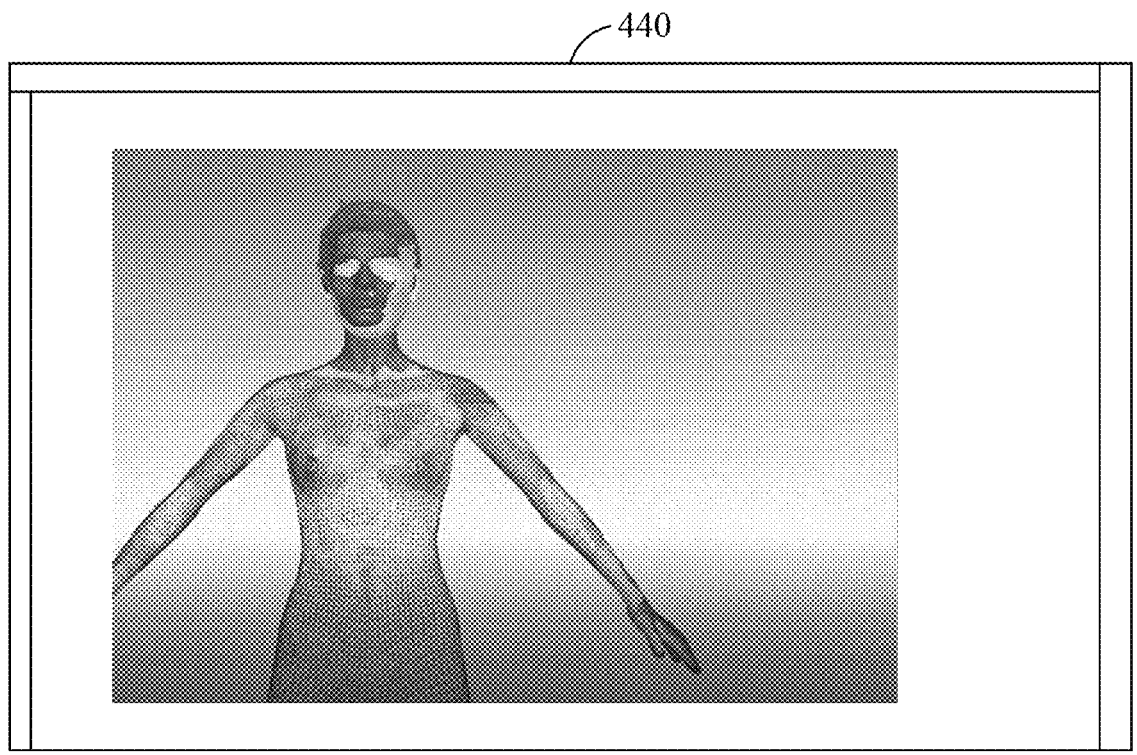

The transformation apparatus may sequentially visualize a process of the template model being aligned with the input model according to at least one of the global optimization and the local optimization, and provide the process to a user, as illustrated in FIGS. 4A and 4B.

Figure 5:
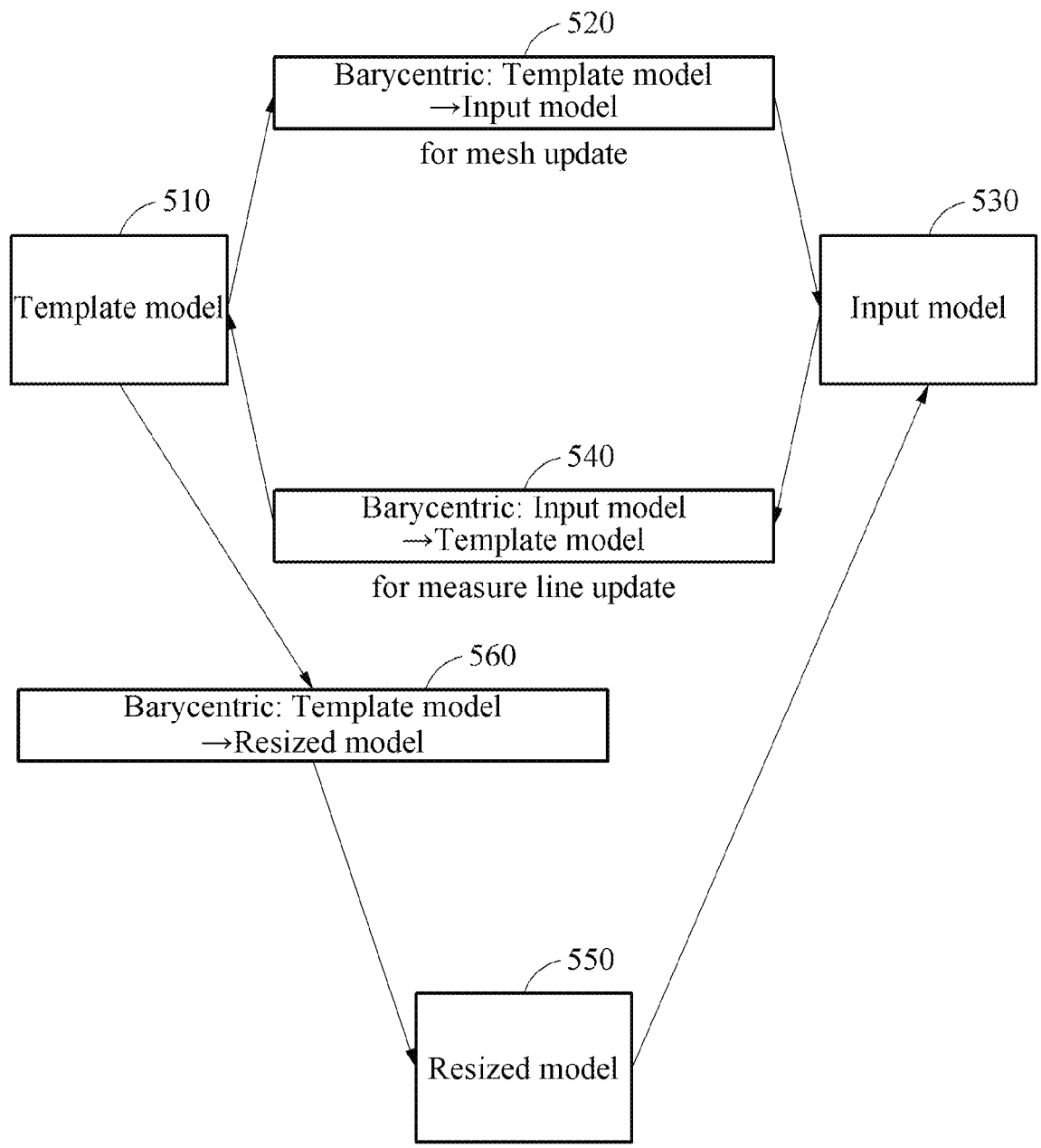
FIG. 5 is a diagram illustrating a method for generating correlation information, according to an example embodiment.

FIG. 5 is a diagram illustrating a method for generating correlation information according to an example embodiment. Referring to FIG. 5, a transformation apparatus may generate a correlation between a template model 510 and an input model 530.

The transformation apparatus may generate barycentric coordinates 520 between second vertices of a second polygon included in a second mesh of the template model 510 and a first polygon included in a first mesh of the input model 530. The barycentric coordinates 520 may be used to update the second mesh of the template model 510. The transformation apparatus may extract, from the barycentric coordinates 520, a plurality of parameters (for example, α, β, and offset) representing 3D positions of an index of the first polygon included in the first mesh and vertices of the second polygon matching the first polygon. The transformation apparatus may change the second mesh of the template model 510 to a first mesh with a first topology of the input model 530 using the parameters extracted from the barycentric coordinates 520.

In addition, the transformation apparatus may generate barycentric coordinates 540 between first vertices of the first polygon included in the first mesh of the input model 530 and the second polygon included in the second mesh of the template model 510. The transformation apparatus may extract, from the barycentric coordinates 520, a plurality of parameters representing 3D positions of an index of the first polygon included in the first mesh and vertices of the second polygon matching the first polygon. For example, the barycentric coordinates 540 may be used to update a size of the input model 530 according to a size inputted by a user. The transformation apparatus may extract, from the barycentric coordinates 540, a plurality of parameters (for example, α, β, and offset) representing 3D positions of an index of the second polygon included in the second mesh and the first vertices of the first polygon matching the second polygon. The transformation apparatus may change the first mesh of the input model 530 to a second mesh with a second topology of the template model 510 using the parameters extracted from the barycentric coordinates 540.

Depending on an example embodiment, when the user inputs a desired model size, the transformation apparatus may generate a model 550 obtained by resizing the template model 510 so as to have the size inputted by the user. For example, the transformation apparatus may generate the model 550 obtained by resizing the template model 510 using an algorithm based on principal component analysis (PCA). The PCA may correspond to a method for reducing a dimension by representing a change in measured variables in the form of a mixture of a small number of independent factors called principal components.

The transformation apparatus may generate a correlation between the resized model 550 and the template model 510. The transformation apparatus may generate barycentric coordinates 560 between second vertices of the second polygon included in the second mesh of the template model 510 and a polygon included in a mesh of the resized model 550.

The transformation apparatus may reflect the updated size of the resized model 550 to the input model 530.

Figure 6:
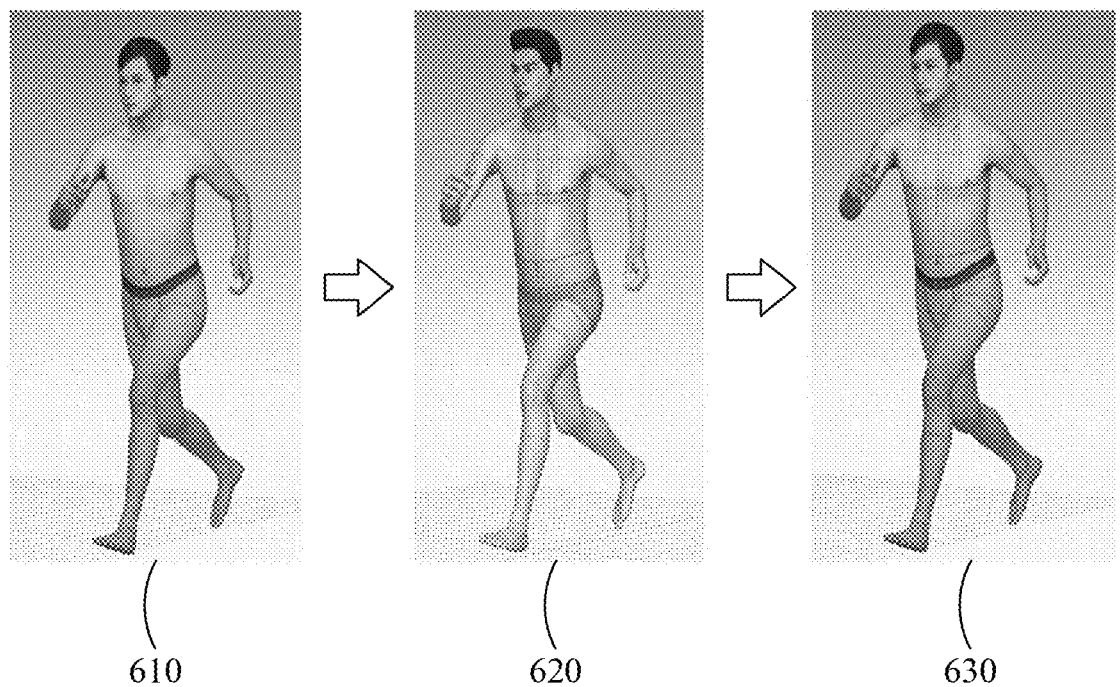
FIG. 6 is a diagram illustrating an example of using correlation information, according to an example embodiment.

FIG. 6 is a diagram illustrating an example of using correlation information according to an example embodiment. FIG. 6 illustrates an input model 610, a template model 620, and an input model 630 changed by reflecting a measurement line of the template model 620 according to an example embodiment. The "measurement line" refers to a reference line for measuring a body circumference or length of a person or avatar, and may include, for example, a chest circumference, a waist circumference, an arm length, a leg length, and the like.

The barycentric coordinates 540 described above with reference to FIG. 5 may be used, for example, to update a size of the input model 610 according to a size inputted by a user.

The transformation apparatus may update, based on a first mesh newly updated by the barycentric coordinates 540 of the input model 610, a mesh and a measurement line of the template model 620. In this case, the measurement line may be defined by barycentric coordinates of the mesh included in the template model 620, and thus, the measurement line may be generated only when there is vertex information of a template model.

The transformation apparatus may generate the input model 630 transformed by reflecting a position of the updated measurement line of the template model 620.

Figure 7:
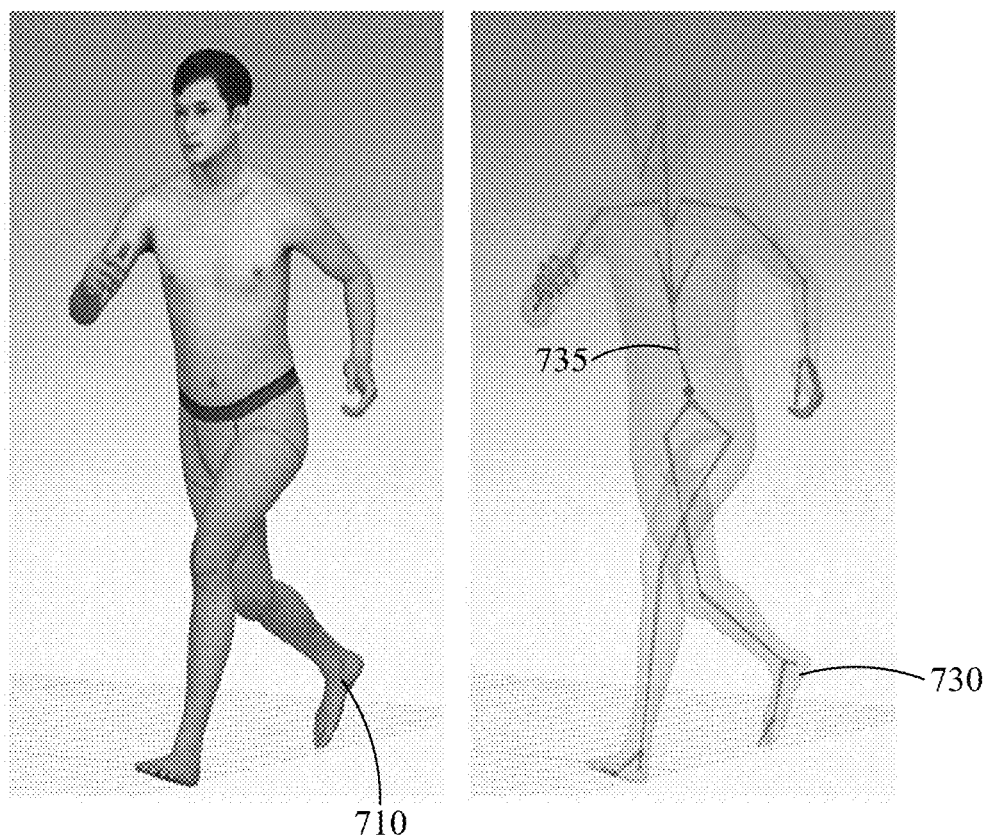
FIG. 7 is a diagram illustrating a method for generating a model skeleton of an input model, according to an example embodiment.

FIG. 7 is a diagram illustrating a method for generating a skeleton of an input model, according to an example embodiment. FIG. 7 illustrates a diagram illustrating an input model 710 and a template skeleton 735 of a template model 730 aligned with the input model 710 according to an example embodiment.

The transformation apparatus may transplant the skeleton 735 of the template model 730 aligned with the input model 710 into a model skeleton of the input model 710. For example, the transformation apparatus may generate the model skeleton of the input model 710, based on rigging information corresponding to the skeleton 735 of the template model 730 aligned with the input model 710. The transformation apparatus may generate the skeleton of the input model 710 by reflecting the rigging information corresponding to the skeleton 735 of the aligned template model 730 to a corresponding position of the input model 710.

After the model skeleton of the input model 710 is generated, the transformation apparatus may generate, based on correlation information, skinning information ("first skinning information") indicating a relationship between the skeleton of the input model 710 and a mesh of the input model 710.

The skinning information may include a skinning weight indicating what percentage each of vertices of a mesh included in a specific model is attached to each bone of a skeleton of a corresponding model. The transformation apparatus may generate first skinning information by combining i) second skinning information indicating a connection relation between the skeleton 735 of the aligned template model 730 and a second mesh of the template model 730, and ii) the correlation information. Here, the "combining" may be construed as obtaining weights of the first skinning information based on (i) weights of the second skinning information and (ii) correlation between meshes of a template model and meshes of the aligned model.

The transformation apparatus may transform the input model 710, based on the correlation information and the skinning information. Depending on an example embodiment, when the input model 710 includes the rigging information, the transformation apparatus may change a pose of the input model using the rigging information of the input model.

Figure 8:
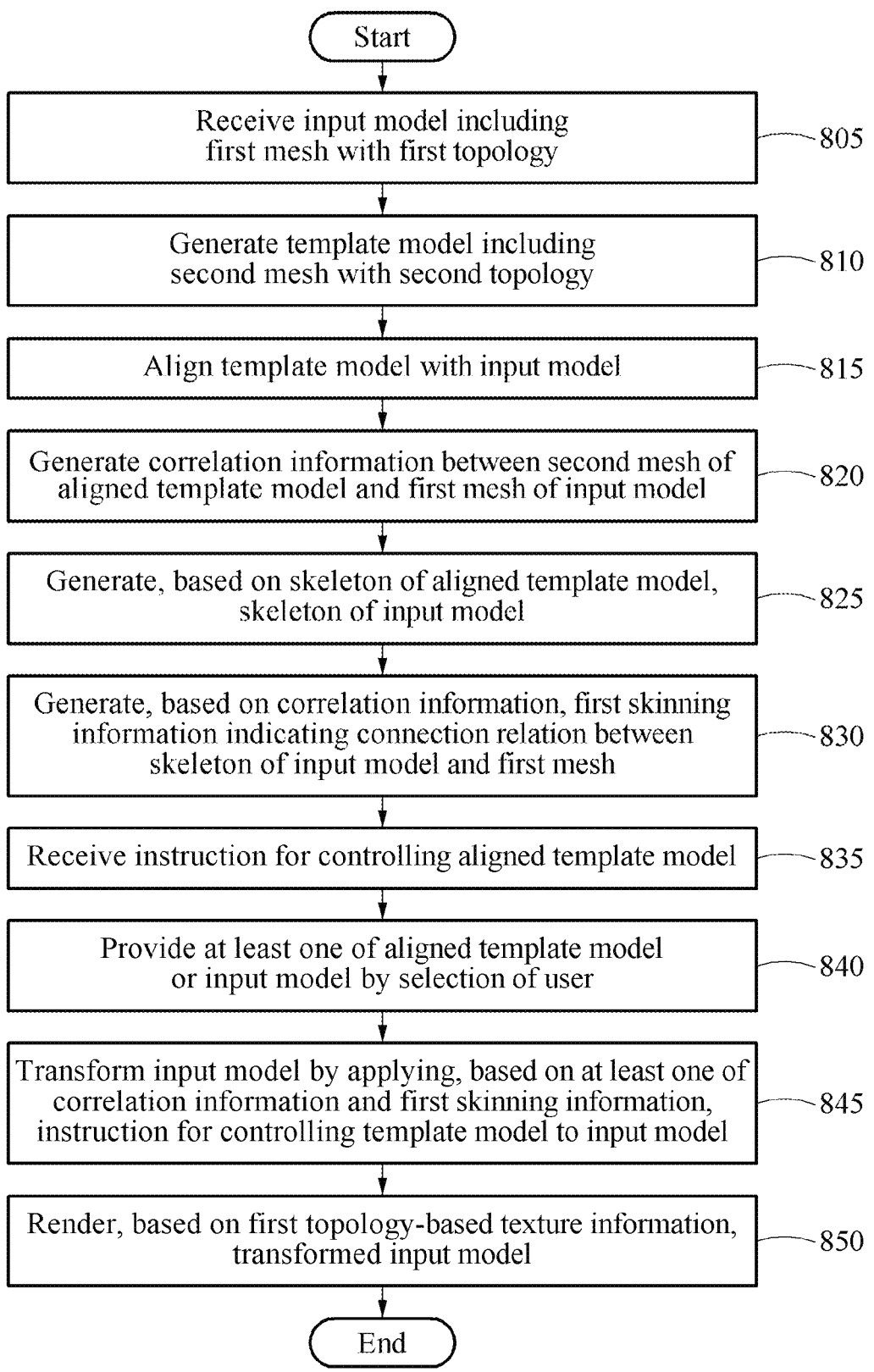
FIG. 8 is a flowchart illustrating a method for transforming an input model, according to another example embodiment.

FIG. 8 is a flowchart illustrating a method for transforming an input model, according to another example embodiment. In FIG. 8, respective operations are illustrated as being performed sequentially, but variations may be made. For example, an order of the respective operations may be changed, and at least two operations may be performed in parallel.

FIG. 8 illustrates a process of transforming, by a transformation apparatus, an input model through operations 805 to 850 according to an example embodiment.

In operation 805, the transformation apparatus may receive an input model including a first mesh with a first topology.

In operation 810, the transformation apparatus may generate a template model including a second mesh with a second topology.

In operation 815, the transformation apparatus may align the template model generated in operation 810 with the input model received in operation 805.

In operation 820, the transformation apparatus may generate correlation information between the second mesh of the template model aligned through operation 815 and the first mesh of the input model.

In operation 825, the transformation apparatus may generate, based on the skeleton of the template model aligned through operation 815, a skeleton of the input model.

In operation 830, the transformation apparatus may generate, based on the correlation information generated through operation 820, first skinning information indicating a connection relation between the skeleton and the first mesh of the input model generated through operation 825.

In operation 835, the transformation apparatus may receive an instruction for controlling the template model aligned through operation 815.

In operation 840, the transformation apparatus may provide at least one of the aligned template model and the input model by selection of a user.

In operation 845, the transformation apparatus may transform the input model by applying, based on at least one of the correlation information and the first skinning information, the instruction for controlling the template model received through operation 835 to the input model.

In operation 850, the transformation apparatus may render, based on the first topology-based texture information, the transformed input model.

Figure 9:
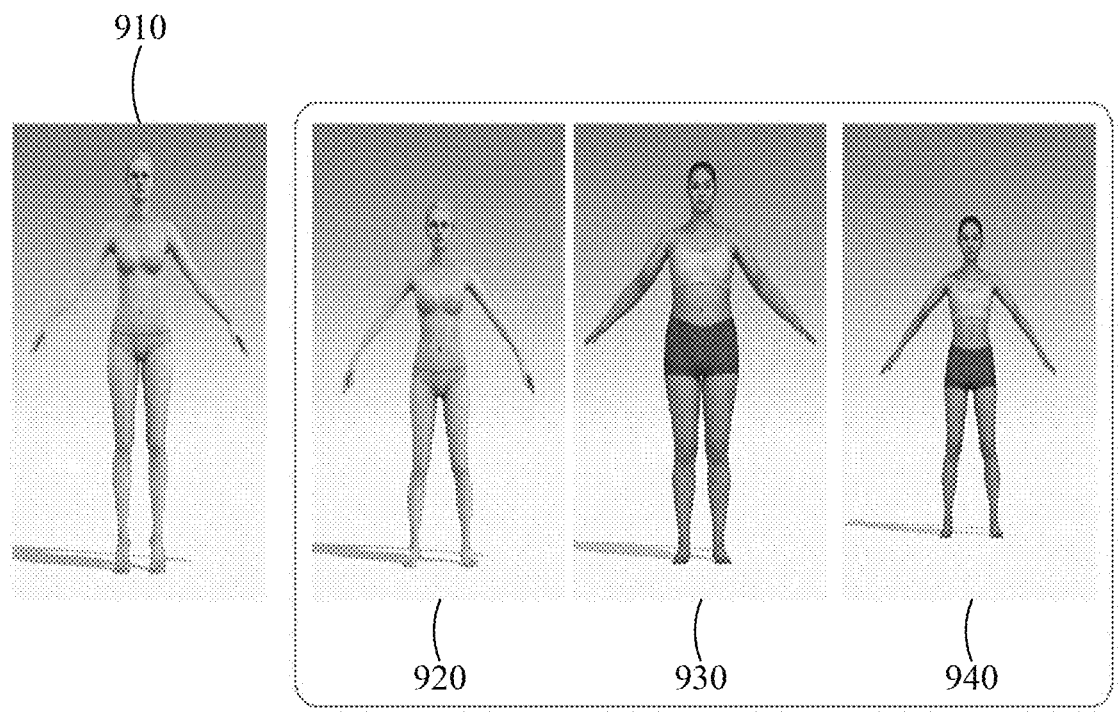

FIG. 9 illustrates types of avatars obtainable from a template model by a method for transforming an input model according to an example embodiment, and FIG. 10 illustrates characteristics obtainable from a template model by a method for transforming an input model according to an example embodiment.

FIGS. 9 and 10 illustrate a template model 910, according to an example embodiment, and three types of transformation models 920, 930, and 940 that are transformed based on the template model 910. Although not illustrated in the drawings, it is assumed that an appearance and body shape of the input model are, for example, the same as those of the model 940.

A transformation apparatus may generate the following three types of models (for example, avatars) through alignment between the template model 910 and the input model. The transformation apparatus may select one from three types (for example, Type A, Type B, and Type C) according to input from a user interface.

The transformation model 920 with Type A may correspond to an avatar that has the same appearance as that of the template model 910, but has the same body shape as that of an input model to be transformed. The transformation model 920 with Type A may be generated by, for example, a 3D body scanner, and thus may be used to transform an input model having a mesh of a face, hands, feet, or the like that does not perfectly match the actual image.

When it is not possible to perfectly match the body shape of the avatar with a measurement change using an avatar editor but having the same shape as the body shape of the input model is desired, and an avatar having an appearance resembling that of the template model may be generated by the user's selection of Type A to transform the input model.

As illustrated in FIG. 10 below, the transformation model 920 with Type A may customize the appearance using accessory files such as hair, shoes, and the like, and resources of the template model 910 such as a pose, a motion, and the like, while maintaining the exact same body shape as that of the input model.

Depending on an example embodiment, the transformation apparatus may maintain the body shape of the input model inputted by the user, but may apply a function of correcting a symmetrical body shape when the user desires.

Unlike Type A, the transformation model 930 with Type B may correspond to a model that uses the appearance of the input model, but is capable of adjusting a body measurement using an editor in the same manner as the template model 910. For example, when the input model is finalized in terms of a body mesh or texture and the user desires to use all functions of the template model 910 while using the input model as a new template model, the user may select transformation model 930 with Type B.

When Type B is selected, the transformation apparatus may change a size of the input model after alignment between the input model and the template model 910, or may transform the input model by applying, to the input model, a pose of a specific template model among pre-stored template models.

The transformation model 940 with Type C, which is a model that uses the appearance of the input model as is, may correspond to a model that has the same appearance and body shape as those of the input model, but is transformable differently from the original input model using information aligned with a topology of the template model 910. The transformation model 940 with Type C may seem the same as the input model in appearance. However, the transformation model 940 with Type enable use of information on poses and/or motions of various pre-stored template models. In addition, with respect to the transformation model 940 with Type C, an auto draping function of displaying a result of automatically draping a 3D garment on the transformation model 940 and/or an auto grading function of automatically converting the 3D garment according to a body shape of the transformation model 940 may be used.

The information on poses and motions of the various pre-stored template models, the auto draping function, and/or the auto grading function may be also used in the same manner for the transformation model 920 with Type A and the transformation model 930 with Type B in addition to the transformation model 940 with Type C.

Features applicable to the three types of transformation models described above with reference to FIG. 9 may be summarized as illustrated in FIG. 10.

The transformation model 920 with Type A may be used to transform the input model having a mesh that is not perfect, and thus the body shape of the input model may not be edited (for example, resized). However, an appearance, hair, accessory, or the like of a template model may be reflected on the mesh.

The transformation model 930 with Type B may have a body mesh and/or texture of the input model that are perfectly made, and thus the body shape of the input model may be edited. However, the transformation model 930 with Type B may use the appearance of the input model as is, and thus, the transformation apparatus may not reflect the appearance, hair, accessory, or the like of the template model to the transformation model 930 with Type B.

The transformation model 940 with Type C may have the same appearance and body shape as those of the input model, and thus the transformation apparatus may not edit the body shape of the input model or transform the appearance of the input model.

Figure 11:
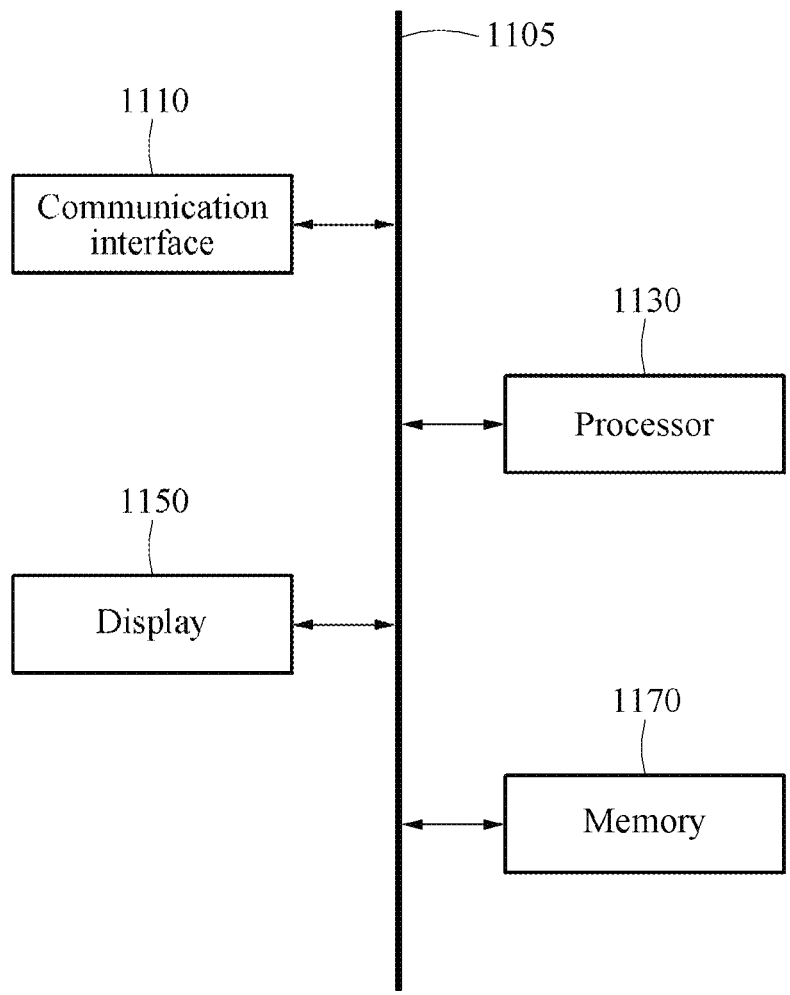
FIG. 11 is a block diagram illustrating an apparatus for transforming an input model, according to an example embodiment.

FIG. 11 is a block diagram illustrating an apparatus for transforming an input model according to an example embodiment. Referring to FIG. 11, an apparatus for transforming an input model (transformation apparatus) 1110 may include a communication interface 1110, a processor 1130, a display 1150, and a memory 1170. The communication interface 1110, the processor 1130, the display 1150, and the memory 1170 may be connected to one another via a communication bus 1105.

The communication interface 1110 may receive an input model including a first mesh with a first topology.

The processor 1130 may generate a template model including a second mesh with a second topology. The processor 1130 may align the template model with the input model, and generate correlation information between the second mesh of the aligned template model and the first mesh of the input model. The processor 1130 may generate, based on a skeleton of the aligned template model, a skeleton of the input model. The processor 1130 may generate, based on the correlation information, first skinning information indicating a connection relation between the skeleton of the input model and the first mesh. The processor 1130 may transform the input model, based on at least one of the correlation information and the first skinning information.

The processor 1130 may adjust a size and a position of a second polygon included in the second mesh such that an outer shape of the template model corresponds to an outer shape of the input model.

The processor 1130 may align the template model with the input model through global optimization of respectively matching body parts of the template model to body parts of the input model such that a position, length, and an angle of each body part of the template model correspond to those of each body part of the input model. The processor 1130 may align the template model with the input model through local optimization of finely adjusting the body parts of the template model respectively matched to the body parts of the input model.

The processor 1130 may generate, based on rigging information corresponding to the skeleton of the aligned template model, the skeleton of the input model.

The processor 1130 may generate the first skinning information by combining the correlation information and second skinning information indicating a connection relation between the skeleton of the aligned template model and the second mesh.

In addition, the communication interface 1110 may receive an instruction for controlling the aligned template model. In this case, the processor 1130 may transform the input model by applying, based on the correlation information and the first skinning information, the instruction for controlling the aligned template model to the input model.

The display 1150 may display the input model transformed by the processor 1130. The display 1150 may display an image visually showing a process in which the template model is aligned with the input model according to at least one of the global optimization and the location optimization performed by the processor 1130.

The memory 1170 may store the input model and the template model. The memory 1170 may store the correlation information between the second mesh and the first mesh generated by the processor 1130. The memory 1170 may store the first skinning information and/or the second skinning information. The memory 1170 may store the input model transformed by the processor 1130.

In addition, the memory 1170 may store various pieces of information generated during processing of the above-described processor 1130. In addition, the memory 1170 may store various pieces of data, programs, and the like. The memory 1170 may include a volatile memory or a non-volatile memory. The memory 1170 may include a massive storage medium such as a hard disk to store various pieces of data.

In addition, the processor 1130 may perform at least one method described above with reference to FIGS. 1 to 10 or an algorithm corresponding to the at least one method. The processor 1130 may be a hardware-implemented data processing device having a circuit with a physical structure for executing desired operations. For example, the desired operations may include a code or instructions included in a program. The processor 1130 may include, for example, a central processing unit (CPU), a graphics processing unit (GPU), or a neural network processing unit (NPU). For example, the hardware-implemented transformation apparatus 1100 may include a microprocessor, a central processing unit, a processor core, a multi-core processor, and a multi-processor, an application-specific integrated circuit (ASIC), and a field programmable gate array (FPGA).

The processor 1130 may execute a program and control the transformation apparatus 1100. A program code executed by the processor 1130 may be stored in the memory 1170.

The method according to the above-described example embodiments may be recorded in non-transitory computer-readable media including program instructions to implement various operations which may be performed by a computer. The media may also include, alone or in combination with the program instructions, data files, data structures, and the like. The program instructions recorded on the media may be those specially designed and constructed for the purposes of the example embodiments, or they may be of the well-known kind and available to those having skill in the computer software arts. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. The media may be transfer media such as optical lines, metal lines, or waveguides including a carrier wave for transmitting a signal designating the program command and the data construction. Examples of program instructions include both machine code, such as code produced by a compiler, and files containing higher level code that may be executed by the computer using an interpreter. The described hardware devices may be configured to act as one or more software modules in order to perform the operations of the above-described example embodiments, or vice versa.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

Although the above example embodiments have been described with reference to the limited embodiments and drawings, however, it will be understood by those skilled in the art that various changes and modifications may be made from the above-mentioned description. For example, even though the described descriptions are performed in an order different from the described manner, and/or the described components such as system, structure, device, and circuit are coupled or combined in a form different from the described manner, or replaced or substituted by other components or equivalents, appropriate results may be achieved.

Therefore, other implementations, other example embodiments, and equivalents to the claims are also within the scope of the following claims.

What is claimed is:

1. A method for transforming an input model, the method comprising:
   receiving an input model including a first mesh with a first topology, wherein the first mesh includes first vertices of the first polygon constituting the first mesh;
   receiving a template model including a second mesh with a second topology, the template model including a template skeleton;
   aligning the template model with the input model to generated an aligned version of the second mesh and an aligned version of the template skeleton;
   determining correlation between the aligned version of the second mesh and the first mesh;
   determining a model skeleton of the input model based on the aligned version of the template skeleton;
   generating first skinning information indicating relationships between the model skeleton and the first mesh according to the correlation; and
   generating a transformed version of the input model using the correlation and the first skinning information,
   wherein determining the correlation comprises:
      generating first barycentric coordinates by projecting second vertices of a second polygon included in the second mesh of the template model to the first polygon included in the first mesh of the input model;
      extracting, from the first barycentric coordinates, a plurality of parameters representing three-dimensional (3D) positions of an index of the first polygon included in the first mesh and the second vertices of the second polygon matching the first polygon; and
      changing the second mesh of the template model to the first mesh with the first topology of the input model using the parameters extracted from the first barycentric coordinates.

2. The method of claim 1, wherein the aligning of the template model with the input model comprises adjusting sizes and positions of polygons in the second mesh such that an outer shape of the template model better matches an outer shape of the input model.

3. The method of claim 1, wherein the aligning of the template model with the input model comprises:
   globally aligning the template model with the input model by modifying at least one of a position, a length, and an angle of each body part of the template model with at least one of a position, a length, and an angle of each body part of the input model; and
   locally aligning the template model with the input model by finely adjusting each body part of the template model with each body part of the input model.

4. The method of claim 3, further comprising displaying at least one the global aligning of the template or the local aligning of the template.

5. The method of claim 1, wherein determining the correlation comprises generating second barycentric coordinates by projecting vertices of the first in the first mesh to the second polygon in the second mesh.

6. The method of claim 1, wherein rigging information of the template model is used to determine the model skeleton.

7. The method of claim 1, wherein the generating of the first skinning information comprises combining the determined correlation and second skinning information indicating relations between the aligned version of the template skeleton and the second mesh.

8. The method of claim 7, wherein the first skinning information indicates weights assigned to bones of the skeleton of the input model in deforming or transforming polygons of the input model.

9. The method of claim 8, wherein generating the transformed version of the input model comprises:
receiving an instruction for controlling at least one bone of the aligned version of the template skeleton; and
deforming or transforming the polygons of the input model by applying the weights to at least a bone of the model skeleton corresponding to the at least one bone of the aligned version of the template skeleton that are controlled by the instruction.

10. The method of claim 1, further comprising rendering texture of the transformed version of input model.

11. The method of claim 1, wherein the input model comprises at least one of a three-dimensional (3D) avatar, a 3D virtual object, and a 3D character.

12. A non-transitory computer-readable storage medium storing instructions thereon, the instructions when executed by a processor cause the processor to:
receive an input model including a first mesh with a first topology, wherein the first mesh includes first vertices of the first polygon constituting the first mesh;
receive a template model including a second mesh with a second topology, the template model including a template skeleton;
align the template model with the input model to generated an aligned version of the second mesh and an aligned version of the template skeleton;
determine correlation between the aligned version of the second mesh and the first mesh;
determine a model skeleton of the input model based on the aligned version of the template skeleton;
generate first skinning information indicating relationships between the model skeleton and the first mesh according to the correlation; and
generate a transformed version of the input model using the correlation and the first skinning information,
wherein the instructions to determine the correlation comprises instruction to:
generate first barycentric coordinates by projecting second vertices of a second polygon included in the second mesh of the template model to the first polygon included in the first mesh of the input model;
extract, from the first barycentric coordinates, a plurality of parameters representing three-dimensional (3D) positions of an index of the first polygon included in the first mesh and the second vertices of the second polygon matching the first polygon; and
change the second mesh of the template model to the first mesh with the first topology of the input model using the parameters extracted from the first barycentric coordinates.

13. The non-transitory computer-readable storage medium of claim 12, wherein instructions to align the template model with the input model comprises instructions to adjust sizes and positions of polygons in the second mesh such that an outer shape of the template model better matches an outer shape of the input model.

14. The non-transitory computer-readable storage medium of claim 12, wherein the instructions to align the template model with the input model comprises instructions to:
globally align the template model with the input model by modifying at least one of a position, a length, and an angle of each body part of the template model with at least one of a position, a length, and an angle of each body part of the input model; and
locally align the template model with the input model by finely adjusting each body part of the template model with each body part of the input model.

15. The non-transitory computer-readable storage medium of claim 14, further storing instructions to display at least one the global aligning of the template or the local aligning of the template.

16. The non-transitory computer-readable storage medium of claim 12, wherein instruction to determine the correlation comprises instruction to generate
second barycentric coordinates by projecting vertices of the first in the first mesh to the second polygon in the second mesh.

17. The non-transitory computer-readable storage medium of claim 12, wherein rigging information of the template model is used to determine the model skeleton.

18. The non-transitory computer-readable storage medium of claim 12, wherein instructions to generate the first skinning information comprises instructions to combine the determined correlation and second skinning information indicating relations between the aligned version of the template skeleton and the second mesh.

19. The non-transitory computer-readable storage medium of claim 12, wherein the first skinning information indicates weights assigned to bones of the skeleton of the input model in deforming or transforming polygons of the input model.

20. The non-transitory computer-readable storage medium of claim 19, wherein instruction to generate the transformed version of the input model comprises instruction to:
receive an instruction for controlling at least one bone of the aligned version of the template skeleton; and
deform or transforming the polygons of the input model by applying the weights to at least a bone of the model skeleton corresponding to the at least one bone of the aligned version of the template skeleton that are controlled by the instruction.

21. A computing device, comprising:
a processor; and
memory coupled to the processor, the memory storing instructions to:
receive an input model including a first mesh with a first topology, wherein the first mesh includes first vertices of the first polygon constituting the first mesh;
receive a template model including a second mesh with a second topology, the template model including a template skeleton;
align the template model with the input model to generated an aligned version of the second mesh and an aligned version of the template skeleton;
determine correlation between the aligned version of the second mesh and the first mesh;

determine a model skeleton of the input model based on the aligned version of the template skeleton;

generate first skinning information indicating relationships between the model skeleton and the first mesh according to the correlation; and generate a transformed version of the input model using the correlation and the first skinning information, wherein the instructions to determine the correlation comprises instruction to:

generate first barycentric coordinates by projecting second vertices of a second polygon included in the second mesh of the template model to the first polygon included in the first mesh of the input model;

extract, from the first barycentric coordinates, a plurality of parameters representing three-dimensional (3D) positions of an index of the first polygon included in the first mesh and the second vertices of the second polygon matching the first polygon; and change the second mesh of the template model to the first mesh with the first topology of the input model using the parameters extracted from the first barycentric coordinates.

\* \* \* \* \*